United States Patent [19]

Kitzinger et al.

[11] Patent Number: 4,884,250

[45] Date of Patent: Nov. 28, 1989

[54] ACCELEROMETER FOR BLAST MONITORING

[75] Inventors: Frank Kitzinger, Montréal; David Sprott, Ile Bizard; Michel Ménard, Pincourt, all of Canada

[73] Assignee: Noranda, Inc., Toronto, Canada

[21] Appl. No.: 272,945

[22] Filed: Nov. 18, 1988

[30] Foreign Application Priority Data

Jan. 29, 1988 [CA] Canada ............................ 557778

[51] Int. Cl.⁴ ...................... H04R 17/00; H04R 11/00
[52] U.S. Cl. ................................ 367/180; 367/188; 181/122
[58] Field of Search ............... 181/122; 367/152, 153, 367/157, 162, 165, 178, 180, 188; 310/326, 327, 340, 345

[56] References Cited

U.S. PATENT DOCUMENTS

| 3,911,388 | 10/1975 | Crump et al. | 367/180 |
| 4,300,220 | 11/1981 | Goff et al. | 367/188 |
| 4,458,341 | 7/1984 | Goebel | 367/178 X |
| 4,599,713 | 7/1986 | Rudaz | 367/178 |

Primary Examiner—Brian S. Steinberger
Attorney, Agent, or Firm—Fleit, Jacobson, Cohn, Price, Holman & Stern

[57] ABSTRACT

An accelerometer for blast monitoring comprises at least one piezoelectric transducer having a piezoelectric membrane attached along the edge thereof to the sidewall of a suitable container and mounted for free movement in such container for generating a high impedance electrical output signal upon deformation of the piezoelectric membrane by vibration during a blast, a high to low impedance converter connected to the piezoelectric membrane for converting the high output impedance of the piezoelectric membrane into a low impedance signal for transmission through long cables to recording equipment, and means for encapsulating the piezoelectric transducer and converter into epoxy or other solid material to minimize response of the transducer to surrounding acoustic signals.

6 Claims, 3 Drawing Sheets

ACCELEROMETER FOR BLAST MONITORING

This invention relates to an accelerometer for blast monitoring.

One of the basic work phases of mining and civil engineering is the removal of rock masses by controlled blasting. To minimize damage to structural components in the vicinity, the blasts are sequentially triggered. Monitoring instruments can record blast induced vibrations against time permitting the comparison of planned and actual blast sequences. Such monitoring instruments can also detect blast induced vibration amplitude for controlling blasting to avoid damage to mine support structures.

The sensors used to measure vibration are usually piezoelectric accelerometers. For accurate measurement, three orthogonally mounted accelerometers are needed. These are cemented into holes drilled in the surrounding rock mass and cannot be recovered after use. However, commercially available accelerometers are very expensive to be sacrificed for the small number of tests usually needed at any one location.

On the other hand, there are on the market a large number of inexpensive piezoelectric transducers commonly called piezoelectric beepers which are widely used in telephones and alarm clocks and which generally consist of a piezoelectric membrane attached along the edge thereof to the sidewall of a suitable container and having no extraneous mass secured thereto. As commonly known, the piezoelectric phenomenon is a reversible process. Mechanical movement can be converted into electrical current as well as electrical current can be converted into mechanical movement. This reversibility permits the use of a sound generating beeper to be also used as a current generating accelerometer. In its original function, the piezoelectric beeper membrane flexes back and forth as the alternating current passes through it. As an accelerometer, the mass of the membrane is retarded by its inertia when the whole unit is vibrated. The deformation suffered by the membrane generates an electrical output which is a close to linear function of acceleration within the frequency range of interest.

Virtually all of the piezoelectric beepers could possibly be used as accelerometers. The key points in choosing a suitable type are: reliable construction and sufficient frequency response. Reliability is usually very good, and sound manufacturing methods can be judged easily by dismantling and observing. Resonance frequencies for the beepers are around the highest sensitivity range of human hearing, 3-4 kHz. Good close to linear operation can be expected below this resonance.

Applicant has found that an inexpensive accelerometer can be built using a piezoelectric beeper provided that certain important modifications are made to the piezoelectric beeper.

The accelerometer, in accordance with the present invention, comprises at least one piezoelectric transducer having a piezoelectic membrane attached along the edge thereof to the sidewall of a suitable container and mounted for free movement in such container for generating a high impedance electrical output signal upon deformation of the piezoelectric membrane by vibration during a blast, a high to low impedance converter for converting the high output impedance of such piezoelectric membrane into a low impedance signal suitable for transmission through long cables to recording equipment, and means for encapsulating the piezoelectric transducer and converter into epoxy or other solid material to minimize response of the transducer to surrounding acoustic signals.

The frequency response of the piezoelectric transducer should be linear within the range of a few cycles per second to about 3 kHz. Sharp low pass filters may be used to eliminate resonance peaks outside that range.

For accurate measurements, three piezoelectric transducers should be encapsulated in an orthogonal arrangement.

The invention will now be disclosed by way of example with reference to the accompanying drawings in which:

FIG. 1 is a diagrammatic side view of a triaxial accelerometer is accordance with the present invention;

FIG. 1a in block diagram showing the electrical interconnection of the various components of the accelerometer.

Figure 1:
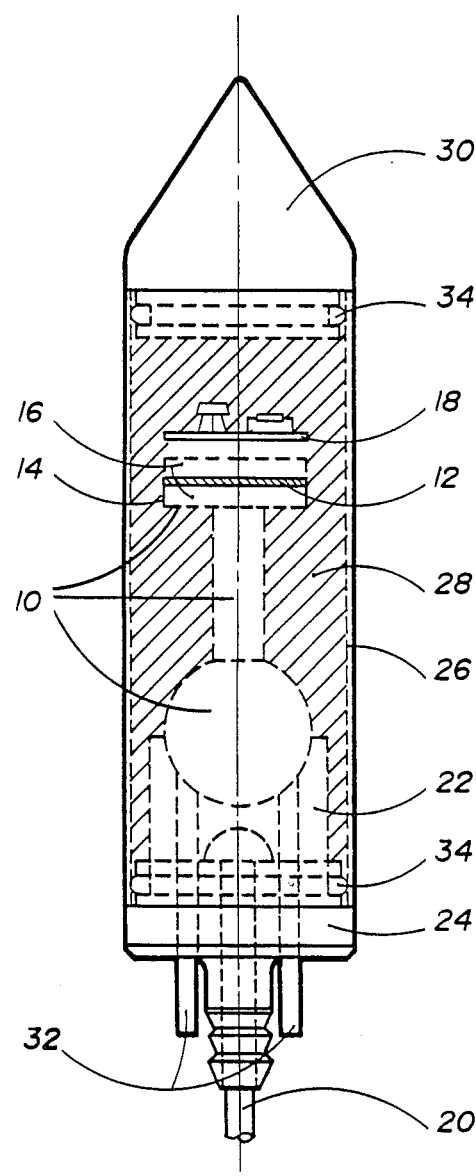
FIG. 1 shows the arrangement of a triaxial accelerometer for blast monitoring.
Figure 1A:
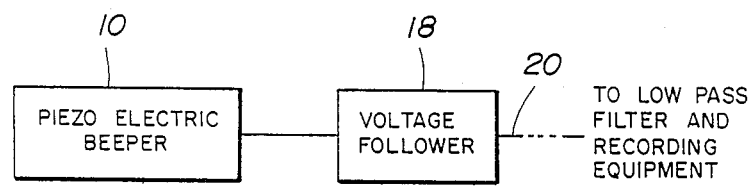

Three piezoelectric beepers 10 are mounted orthogonally. Each piezoelectric beeper has a membrane 12 attached along the edge thereof to the sidewall of a suitable container 14. The position of the piezoelectic membrane 12 is indicated in the uppermost unit. An air chamber 16 formed in container 14 permits free movement of the piezoelectric membrane. Each piezoelectric sensor has a voltage follower circuit 18 (only one shown) which is connected to the piezoelectric membrane to convert its high impedance output to low impedance suitable for transmission through long cables 20 to a suitable low pass filter system and recording equipment as shown in FIG. 1a. Commercially available voltage followers or buffers, such as TL 068 C made by Texas Instruments, can be used for this purpose. Positioning of the sensors is aided by a support structure 22. The whole assembly is built on a metal end cap 24, wired and a cylindrical metal housing 26 is installed over the end cap. The remaining cavity around the sensors is filled with an epoxy compound 28, and finally a metal tip 30 is put into place.

Positioning during installation is facilitated by registration pins 32. O-ring seals 34 are located at the top and bottom of the container to protect the unit from water damage.

Figure 2:
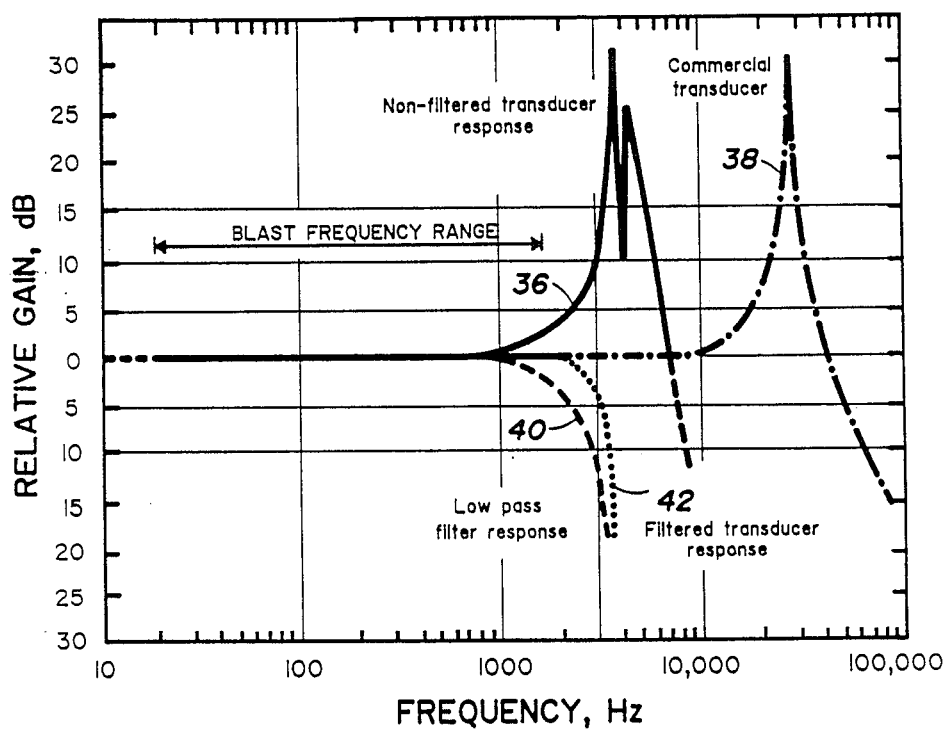
FIG. 2 is a typical frequency response curve for an accelerometer in accordance with the invention.

FIG. 2 shows the frequency response curve 36 of the accelerometer in comparison to the frequency response curve 38 of an expensive commercial accelerometer. A suitable low pass filter response curve 40 and the final filtered response curve 42 of the accelerometer is also indicated.

Figure 3:
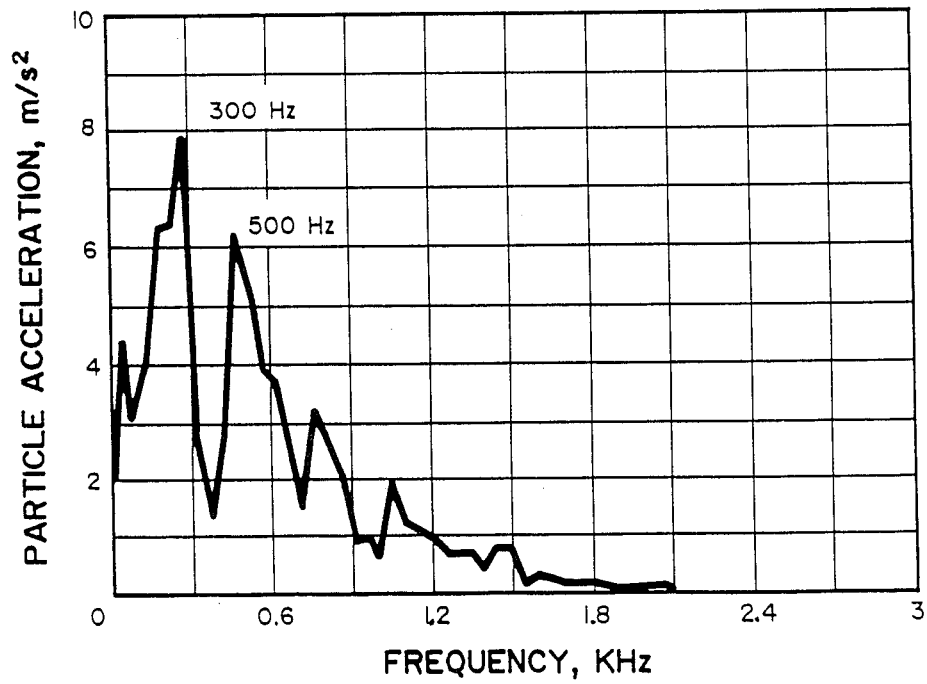
FIG. 3 is a fast Fourier transform of vibration record obtained by the accelerometer.

The fast Fourier transform of a mine blast signal obtained with the accelerometer is shown in FIG. 3 and clearly indicates the adequacy of the 3 kHz bandwidth.

Figure 4:
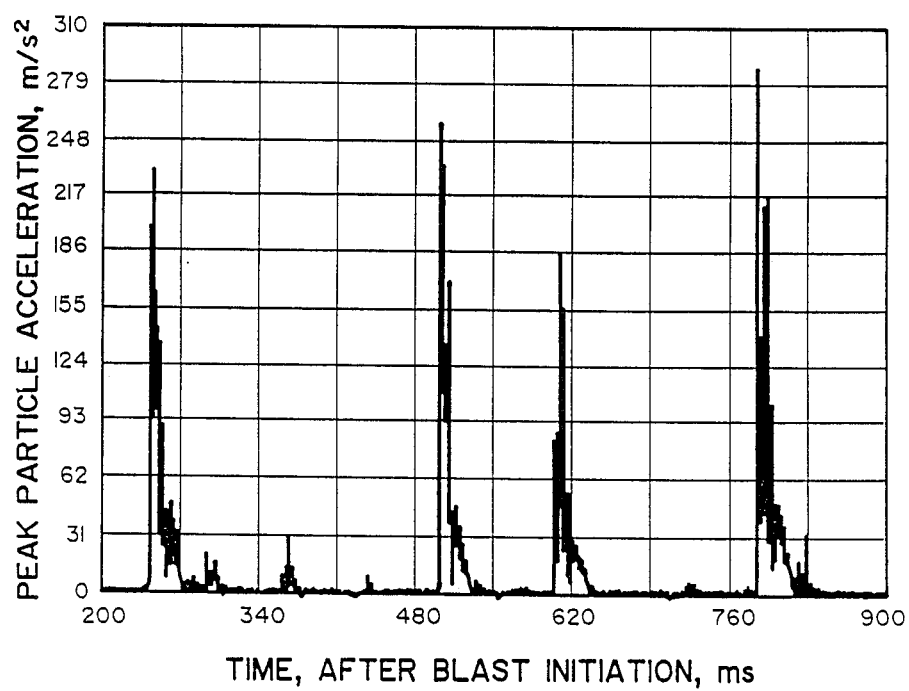
FIG. 4 shows a mine production blast signal sensed by the accelerometer.

FIG. 4 shows a mine production blast signal snsed by the accelerometer. Tthe vibration amplitude summation of the three orthogonally mounted sensors by a computer provides peak particle acceleration against time. Time information is important to judge how the designed blast sequence took place. Peak values of particle acceleration is important to judge the possible damage caused by the blast to support structures.

Due to its relative low cost, the accelerometer in accordance with the present invention is a disposable device, which means that if it is permanently cemented in the ground during blasting, it may be abandoned after use. It should be understood, however, that the novel accelerometer may be reused several times if it is not permanently cemented in the ground during blasting.

Although the invention has been disclosed with reference to a preferred embodiment, it is to be understood that it is not limited to that embodiment and that other alternatives are also envisaged within the scope of the following claims.

We claim:

1. An accelerometer for blast monitoring comprising:
   (a) at least one piezoelectric transducer having a piezoelectric membrane attached along an edge thereof to the sidewall of a container and having no extraneous mass secured thereto, said piezoelectric membrane being mounted for free movement in such container for generating a high impedance electrical output signal upon deformation of the piezoelectric membrane by its own inertia by vibration during a blast;
   (b) a high to low impedance converter connected to said piezoelectric membrane for converting a high impedance output of said piezoelectric membrane into a low impedance signal for transmission through cables to electrical signal recording equipment; and
   (c) means for encapsulating the piezoelectric transducer and converter into encapsulating material to minimize response to the transducer to surrounding acoustic signals.

2. An accelerometer as defined in claim 1, further comprising a low pass filter connected to the output of said converter for eliminating resonance peaks from the frequency response.

3. An accelerometer as defined in claim 1 including three piezoelectric transducers mounted in an orthogonal arrangement.

4. An accelerometer as defined in claim 1, wherein said means for encapsulating said piezoelectric transducer comprises a metal end cap, a support structure mounted on said end cap for holding said piezoelectric transducer, a cylindrical metal housing mounted at one end on said end cap and filled with said encapsulating material and a metal tip closing the other end of said cylindrical housing.

5. An accelerometer as defined in claim 4, further comprising registration pins located on said end cap for positioning the accelerometer.

6. An accelerometer as defined in claim 4, further comprising O-ring seals located at both end of said cylindrical housing to protect the accelerometer from water damage.

* * * * *